Nov. 18, 1941.    C. H. ALLEN    2,262,746
BATTERY VENT PLUG
Filed March 4, 1940
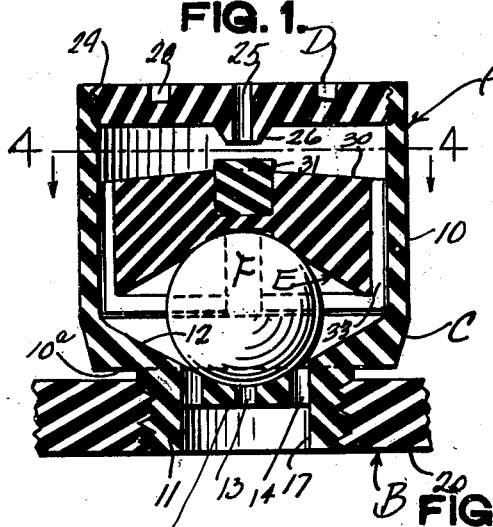
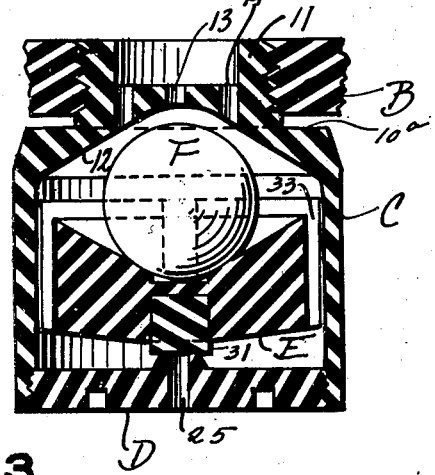
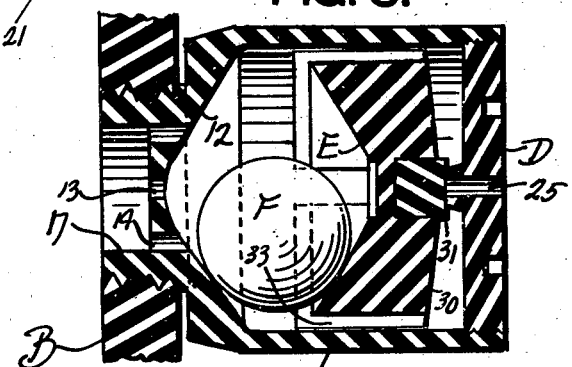
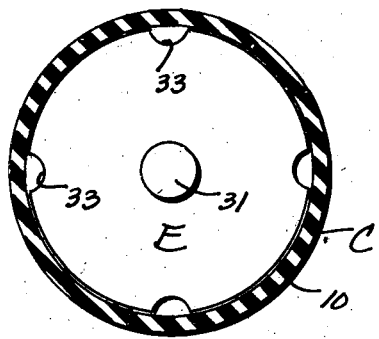
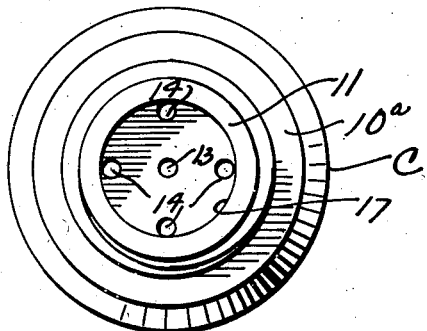
INVENTOR.
C. Herbert Allen
BY *Lancaster, Allwine & Rommel*
ATTORNEYS.

Patented Nov. 18, 1941

2,262,746

UNITED STATES PATENT OFFICE 2,262,746

BATTERY VENT PLUG

Charles Herbert Allen, South Temple, Pa., assignor to Reading Batteries, Inc., Reading, Pa., a corporation of Pennsylvania Application March 4, 1940, Serial No. 322,244

2 Claims. (Cl. 251—147)

This invention relates to improvements in vent plugs for liquid electrolyte storage batteries.

The primary object of this invention is the provision of an improved vent plug construction for storage batteries of the liquid electrolyte type which is relatively simple in construction and which will permit venting of gases from the battery but will prevent leakage of any of the liquid from the battery, as sometimes occur when the battery is upset or tilted.

Other objects and advantages of the invention will be apparent during the course of the following detailed description.

In the accompanying drawing, forming a part of this specification, and wherein similar reference characters designate corresponding parts thruout the several views, Figure 1 is a vertical sectional view taken thru the improved vent plug as applied in a storage battery wall.

Figure 2 shows the relation of parts should the battery become inverted.

Figure 3 is a vertical sectional view showing the action of the battery in closing off the vent should the battery become tilted upon its side.

Figure 4 is a vertical sectional view taken thru the vent plug substantially on the line 4—4 of Figure 1.

Figure 5 is a bottom plan view of the improved vent plug.

In the accompanying drawing, wherein for the purpose of illustration is shown only a preferred embodiment of the invention, the letter A may generally designate the improved vent plug construction adapted to be used in a storage battery B of any approved type.

The improved vent plug construction A consists of a hollow body C having a cap D. In the body is located a valve member E whose action is rendered positive by means of a weighted lead ball F, or similar member.

The body C is preferably constructed of hard rubber or some similar insulating acid-resistant material including a cylindrical-shaped body wall 10 and a bottom 10ª terminating in a screw threaded shank 11. The latter is for screw threaded application in a screw threaded opening of the top wall of the battery B, as indicated in the drawing. The inside surface 12 of the bottom wall 10ª tapers convergently from the side wall 10 to a point at the vertical axis of the body C. In this bottom wall an axial opening 13 is provided for vent purposes and surrounding this opening 13 are similar vents or openings or ports 14, which open at the periphery of the main opening 17 thru the screw threaded shank 11; the latter extending below the bottom surface of the wall 10ª, as shown in the drawing. It is intended that the vent plug when screw threaded in the battery wall B, will lie above the inner surface 20 of this battery wall. That is, the screw threaded shank 11 may be flush with the inside surface of the battery wall B, as shown in the drawing, and thus the bottom surface 21 of the bottom wall 10ª which faces in the shank 11 lies above the inside surface 20 of the battery wall. At its top, the cylindrical-shaped side wall 10 is internally screw threaded at 24 to receive the detachable cap D forming a part of the body C. This opening in the top of the body exposes the entire chamber in the body. Centrally the cap D is provided with a vent duct 25 which has a depending flange 26 below the inside surface of the cap for valve abutment purposes. Similar openings 28 in the top of the cap D may receive the prongs of a spanner wrench.

The valve member E is preferably of hard rubber or some analogous acid-resistant material. It is of circular disc shaped general conformation. Its top surface 30 has a gentle slope downwardly from the center to the side edges thereof and at its center the top surface is provided with a socket for receiving a soft rubber valve plug 31 which projects above the top surface of the valve member proper and is adapted to seat on the depending flange 26 of the valve plug cap D for closing off the vent duct 25, as shown in Figures 2 and 3 of the drawing, should the battery become upset or tilted.

The valve member E slides freely in the chamber provided in the plug body C, and at its peripheral edges it is vertically notched or grooved at 33 to permit venting of gases and the flow of electrolyte back into the battery should any flow into the plug body above the valve member proper before the vent duct is closed off. The bottom surface of the valve proper E is hollowed out; the same sloping divergently downward from the center of the valve body in facing complementary relation to the concavity or slope of the surface 12 of the casing C above described. In the space between these facing sloping or concaved surfaces of the wall 10ª and valve member E is adapted to be disposed the weighted ball F, which is preferably of lead or some similar material.

In normal position, the ball F rests upon bottom wall 10 of the plug body C and in this position the side openings 14 are open to permit escape of gas from the battery thru the vent groove 33 of the valve proper and out of the vent duct 25. Should the battery become tipped at an angle as low as 25°, the weight of the ball F rolling along the sloping surfaces of the bottom wall of the plug body and valve proper, will force the latter toward the valve body cap D, with the rubber plug 31 in engagement with the depending collar 26 and close off the vent duct 25, as illustrated in Figure 3. The same thing occurs should the battery become upset, as shown in Figure 2.

From the foregoing description of this invention, it is apparent that a vent plug has been provided, parts of which are relatively inexpensive to manufacture and compactly arranged for a positive operation to permit venting of gas at all times and prevent the spilling of any of the liquid electrolyte out of the battery under any circumstances. The surfaces of the valve proper and valve body are all sloping to permit the drain of the liquid electrolyte back into the battery at all times. That is true even when the vent plug is in normal position, since the ducts 14 are open at all times.

The various parts are so arranged that they will not become clogged under any circumstances by means of foreign bodies such as battery active material or pieces of wood from the plate separators.

Various changes in the shape, size and arrangement of parts may be made to the form of invention herein shown and described, without departing from the spirit of the invention or the scope of the following claims.

I claim:

1. As an article of manufacture, a vent plug for storage batteries comprising side walls, a bottom wall and a top wall defining a chamber therein, the bottom wall having an externally screw threaded shank for attachment to a storage battery, said shank having vent duct means therein for venting of gases from the battery into the chamber of the plug, the bottom wall of the plug casing having its inside surface sloping convergently downward from the side walls towards said entrance vent duct means, the top wall of the casing having exit vent duct means, a slidable valve member in the casing having a portion adapted to contact the casing top for closing off the exit vent duct means should the casing become tipped from a normal position, said valve body having vent passages therein and being provided with a bottom surface sloping divergently downward from the center of the valve to the peripheral edges thereof, and a weighted ball in the casing between the facing sloping surfaces of the bottom wall of the casing and the bottom surface of the valve.

2. As an article of manufacture, a vent plug for storage batteries and the like comprising the casing having a chamber therein and provided with means thereon to attach it to a battery or other container, said casing having vents therein leading from the chamber of the casing into the container to which the plug is adapted to be attached, said casing remote from the container attaching means having a vent passageway therein, a valve member slidable longitudinally in the casing having a portion adapted to close off the vent passageway when the plug and the container to which it is attached are moved to an abnormal position, the facing surfaces of the valve member and the casing adjacent the location where the casing is adapted to be attached to a container being divergent from the outer sides of the casing in direction toward the axis of the casing, and a weighted ball member between said divergent surfaces adapted to shift when the plug or container to which the plug is to be attached are tipped from a normal position for moving the valve member into closing relation with the vent passageway aforesaid.

CHARLES HERBERT ALLEN.